(12) United States Patent
Chang et al.

(10) Patent No.: US 11,835,720 B2
(45) Date of Patent: Dec. 5, 2023

(54) HEAD-UP DISPLAY SYSTEM HAVING A HOLOGRAPHIC PANEL

(71) Applicant: GM Global Technology Operations LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/700,902

(22) Filed: Mar. 22, 2022

(65) Prior Publication Data
US 2023/0305300 A1    Sep. 28, 2023

(51) Int. Cl.
*G02B 27/01*    (2006.01)

(52) U.S. Cl.
CPC .. *G02B 27/0103* (2013.01); *G02B 2027/0187* (2013.01); *G02B 2027/0196* (2013.01)

(58) Field of Classification Search
None
See application file for complete search history.

(56) References Cited

U.S. PATENT DOCUMENTS

| | | | | |
|---|---|---|---|---|
| 10,379,612 | B1* | 8/2019 | Bonnier | G06F 3/0304 |
| 10,823,963 | B2* | 11/2020 | Banyay | B60J 1/02 |
| 2015/0236302 | A1* | 8/2015 | Gyoung | H01L 51/5271 |
| | | | | 257/40 |
| 2015/0268399 | A1* | 9/2015 | Futterer | G02B 6/0068 |
| | | | | 362/606 |
| 2016/0209647 | A1* | 7/2016 | Fürsich | G02B 27/0075 |
| 2016/0327906 | A1* | 11/2016 | Futterer | G03H 1/2294 |
| 2017/0045740 | A1* | 2/2017 | Hirata | H04N 9/3164 |
| 2017/0248747 | A1* | 8/2017 | Kim | G02B 30/27 |
| 2018/0181067 | A1* | 6/2018 | Hasedzic | G03H 1/02 |
| 2019/0094803 | A1* | 3/2019 | Futterer | G02B 27/0927 |
| 2019/0171014 | A1* | 6/2019 | Chen | G02B 27/0101 |

(Continued)

FOREIGN PATENT DOCUMENTS

CN    106004443 A  * 10/2016  ............. B60K 35/00

OTHER PUBLICATIONS

F. Bruder, T. Facke, T. Rolle, The Chemistry and Physics of Bayfol HX Film Holographic Photopolymer, 2017, p. 1-36 Polymers, Leverkusen, Germany.

(Continued)

*Primary Examiner* — Fred Tzeng
(74) *Attorney, Agent, or Firm* — Vivacqua Crane PLLC

(57) ABSTRACT

A head-up display system of a vehicle visually transmits information to eyes of an occupant. The head-up display system comprises an illumination device configured to emit a display light and a windshield spaced from the illumination device and extending transverse to the display light. The head-up display system comprises a holographic panel coupled to and extending with the windshield and arranged to diffract the display light toward the eyes of the occupant. The display light emits toward the holographic panel in an entrance direction at an entrance angle relative to an axis normal to the holographic panel and diffracts away from the holographic panel in an exit direction at an exit angle relative to the axis, which is different than the entrance angle.

17 Claims, 5 Drawing Sheets

(56) References Cited

U.S. PATENT DOCUMENTS

| | | | |
|---|---|---|---|
| 2019/0243140 A1* | 8/2019 | Erler | G02B 5/02 |
| 2020/0088996 A1* | 3/2020 | Fu | G03H 1/24 |
| 2020/0192282 A1* | 6/2020 | Kim | G03H 1/0486 |
| 2020/0349836 A1* | 11/2020 | Shibata | B60Q 1/50 |
| 2021/0067769 A1* | 3/2021 | Frederiksen | H04N 17/002 |
| 2022/0107501 A1* | 4/2022 | Muravev | G02B 6/0055 |
| 2022/0357574 A1* | 11/2022 | Chang | G02B 27/0101 |

OTHER PUBLICATIONS

U.S. Appl. No. 17/481,900; Inventors: Thomas A. Seder, Kai-Han Chang. filed Sep. 22, 2021; 20 pages.

* cited by examiner

HEAD-UP DISPLAY SYSTEM HAVING A HOLOGRAPHIC PANEL

INTRODUCTION

The present disclosure relates to a head-up display system, and more particularly to a holographic panel for a head-up display system.

In recent years, head-up display systems have seen increased use in vehicles. These systems provide information to the driver of the vehicle in a transparent display (typically the windshield) aligned with the driver's field of vision out of the vehicle, which prevents the occupant from having to divert their attention away from the road to view the information. The use of head-up displays reduces distracted driving and improves the safety of operating the vehicle. Traditional head-up display systems reflect light from an illumination device off the windshield toward the driver. However, the position of the illumination device depends on the incident angle of the light relative a normal axis of the glass and the corresponding angle of reflection toward the eyes of the occupant. Packaging requirements of the vehicle may limit the positioning of the illumination device, which affects the position of the reflected light.

Thus, while current head-up display systems achieve their intended purpose, there is a need for a new head-up display system that addresses these issues.

SUMMARY

According to several aspects of the present disclosure, a head-up display system of a vehicle visually transmits information to eyes of an occupant. The head-up display system comprises an illumination device configured to emit a display light and a windshield spaced from the illumination device and extending transverse to the display light. The head-up display system comprises a holographic panel coupled to and extending with the windshield and arranged to diffract the display light toward the eyes of the occupant. The display light emits toward the holographic panel in an entrance direction at an entrance angle relative to an axis normal to the holographic panel and diffracts away from the holographic panel in an exit direction at an exit angle relative to the axis, which is different than the entrance angle.

In one aspect, the windshield defines a surface area, with the holographic panel disposed along a portion of the windshield that is less than the surface area.

In another aspect, the windshield defines a horizontal axis bisecting the windshield and defines an upper section above the horizontal axis and a lower section below the horizontal axis, with the holographic panel disposed within the lower section of the windshield.

In another aspect, the windshield comprises an inner surface facing an interior of the vehicle and an outer surface facing an exterior of the vehicle, with the holographic panel disposed along the inner surface of the windshield.

In another aspect, the windshield comprises at least two sheets stacked between the inner and outer surfaces, with each of the sheets comprising at least one internal surface facing the internal surface of another adjacent sheet, and with the holographic panel disposed along the internal surface of one of the sheets.

In another aspect, the at least two sheets are comprised of glass.

In another aspect, the illumination device is further defined as at least two illumination devices and the holographic panel is further defined as at least two holographic panels, each individually corresponding to the at least two illumination devices, wherein each of the illumination devices emit the respective display light toward the respective holographic panel and each of holographic panels diffract the display lights toward a common eyebox defined as the general location of the eyes of the occupant.

In another aspect, the at least two holographic panels are spaced from one another horizontally along the windshield.

In another aspect, the holographic panel has a thickness of about 10 μm to about 100 μm.

In another aspect, the thickness of the holographic panel is of about 50 μm to about 70 μm.

In another aspect, the holographic panel has a grating angle of about 90 degrees to about 180 degrees.

In another aspect, the holographic panel has a refractive index modulation of about 0.001 to about 0.05.

In another aspect, the refractive index modulation of the holographic panel is of about 0.003 to about 0.02.

In another aspect, the holographic panel is a film adhered to the windshield.

In another aspect, the head-up display system further comprises a spatial light modulator proximate the illumination device and arranged to receive the display light emitted from the illumination device, impose a holographic image on the display light, and transmit the display light toward the holographic panel.

In another aspect, the head-up display system further comprises a pupil replicator arranged to receive the display light emitted from the illumination device, replicate the display light into a plurality of display light, and transmit the plurality of display light parallel to one another toward the holographic panel.

In another aspect, the illumination device is further defined as a laser, with the display light emitted by the laser being coherent.

According to several aspects of the present disclosure, a head-up display system of a vehicle visually transmits information to eyes of an occupant. The head-up display system comprises at least two illumination devices each configured to emit a display light and a windshield spaced from the illumination device and extending transverse to the display light. The head-up display system further comprises at least two holographic panels panel coupled to and extending with the windshield, with each individually corresponding to the at least two illumination devices and arranged to diffract the respective display light toward the eyes of the occupant. Each of the display lights emit toward the respective holographic panel in an entrance direction at an entrance angle relative to an axis normal to the holographic panel and diffract away from the holographic panel in an exit direction at an exit angle relative to the axis, which is different than the entrance angle. The windshield defines a surface area, with each of the holographic panels disposed along a portion of the windshield that is less than the surface area.

In one aspect, the at least two holographic panels are spaced from one another horizontally along the windshield.

According to several aspects of the present disclosure, a head-up display system of a vehicle visually transmits information to eyes of an occupant. The head-up display system comprises at least two illumination devices each configured to emit a display light and a windshield spaced from the illumination device and extending transverse to the display light. The head-up display system further comprises at least two holographic panels panel coupled to and extending with the windshield, with each individually corresponding to the at least two illumination devices and arranged to diffract the respective display light toward the eyes of the occupant. Each of the display lights emit toward the respective holographic panel in an entrance direction at an entrance angle relative to an axis normal to the holographic panel and diffract away from the holographic panel in an exit direction at an exit angle relative to the axis, which is different than the entrance angle. The windshield defines a surface area, with each of the holographic panels disposed along a portion of the windshield that is less than the surface area. The windshield defines a horizontal axis bisecting the windshield and defines an upper section above the horizontal axis and a lower section below the horizontal axis, with the holographic panels disposed within the lower section of the windshield. Each of the holographic panels has a thickness of about 10 μm to about 100 μm. Each of the holographic panels has a grating angle of about 90 degrees to about 180 degrees. Each of the holographic panels has a refractive index modulation of about 0.001 to about 0.05.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
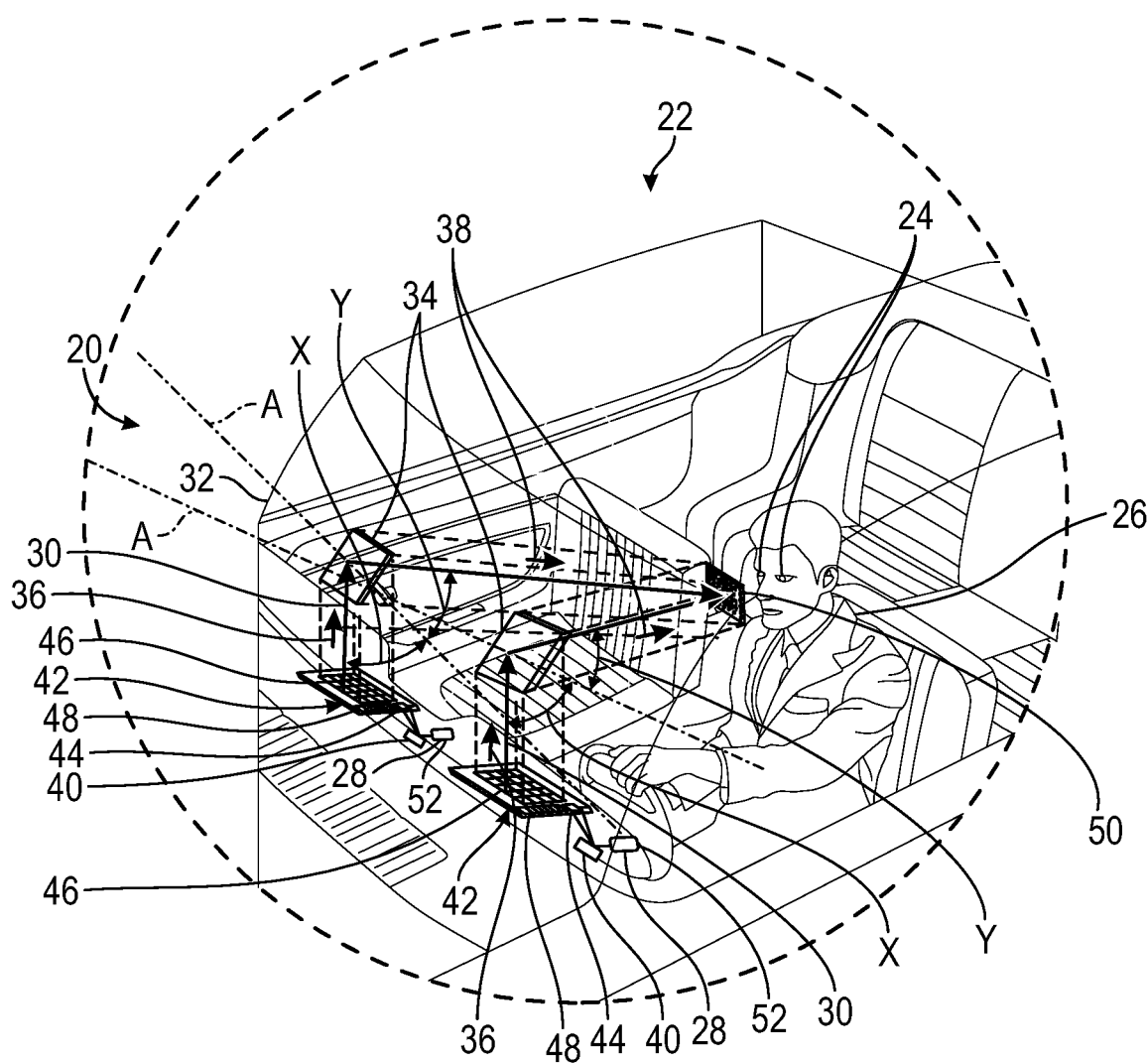
FIG. 1 is a perspective view of one example of a vehicle comprising a head-up display system including illumination devices each emitting a display light and a holographic panels diffracting the display lights toward eyes of an occupant.

Referring to FIG. 1, a head-up display system is shown generally at 20. The head-up display system 20 is configured for use with a vehicle 22. The head-up display system 20 visually transmits information to eyes 24 of an occupant 26. In one example, the occupant 26 is positioned within the vehicle 22 to operate the vehicle 22 (as shown in FIG. 1). As such, the head-up display system 20 may be arranged to transmit information to the occupant 26 that is positioned within the vehicle 22 to operate the vehicle 22 (i.e., sitting on a driver's seat within the vehicle 22). In other examples, the head-up display system 20 may be arranged to transmit information to the occupant 26 that is positioned within the vehicle 22 as a passenger. The occupant 26 as a passenger may be positioned in any suitable location within the vehicle 22 (i.e., first row, second row, third row, etc.).

The head-up display system 20 comprises an illumination device 28 configured to emit a display light 30 and a windshield 32 spaced from the illumination device 28 and extending transverse to the display light 30. The head-up display system 20 comprises a holographic panel 34 coupled to and extending with the windshield 32 and arranged to diffract the display light 30 toward the eyes 24 of the occupant 26. The display light 30 emits toward the holographic panel 34 in an entrance direction 36 at an entrance angle X relative to an axis A normal to the holographic panel 34 and diffracts away from the holographic panel 34 in an exit direction 38 at an exit angle Y relative to the axis A, which is different than the entrance angle X.

The information presented to the occupant 26 within the display light 30 may pertain to the operation of the vehicle 22, such as the vehicle's velocity, direction of travel, engine revolutions per minute, fuel level, battery state of charge, navigational instructions, blind-spot indication, interior and exterior temperatures, weather indications, indication of obstacles, comfort controls, radio settings, just to name a few. However, the information may pertain to any suitable topic or subject that may be displayed to occupant 26.

Without the holographic panel 34, light emitted from the illumination device 28 reflects off the windshield 32 with an exit angle that is equal to the entry angle. In order to ensure that the display light 30 reaches the occupant 26, the illumination device 28 must be positioned such that the entry and exit angles are equal to one another and the exit angle transmits the display light 30 toward the eyes 24 of the occupant 26. However, packaging of the illumination device 28 (e.g., within a dashboard or a pillar) may inhibit the location of the illumination device 28 to ensure the display light 30 reaches the eyes 24 of the occupant 26. Furthermore, the reflectivity is polarization-dependent. If the incident angle is close to Brewster's angle and the polarization of light is P-Polarization, the light is not visible to the occupant 26.

Figure 7:
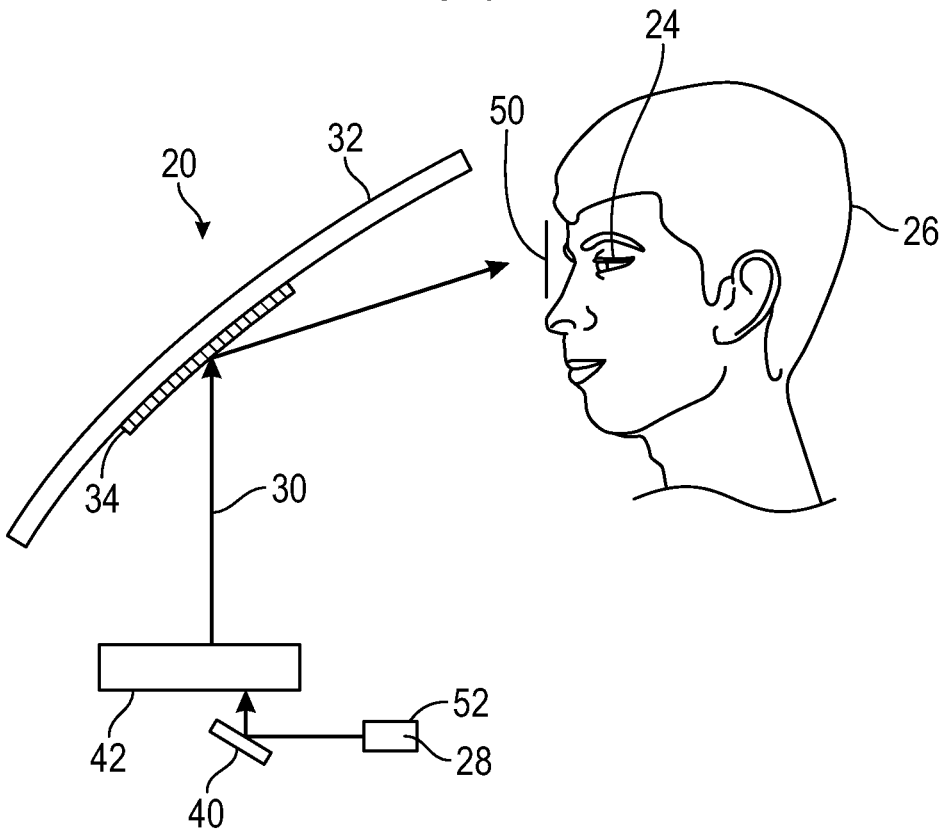
FIG. 7 is a side plan view of one example of the head-up display system showing the display light diffracted toward the eyes of the occupant.

In the example shown in FIGS. 1 and 7, the windshield 32 is positioned above the illumination device 28. As such, the display light 30 transmits upwardly toward the windshield 32. The positioning of the windshield 32 transverse to the display light 30, in conjunction with the holographic panel 34, facilitates diffraction of the display light 30 toward the eyes 24 of the occupant 26

The head-up display system 20 further comprises a spatial light modulator 40 (SLM) proximate the illumination device 28 and arranged to receive the display light 30 emitted from the illumination device 28, impose a holographic image on the display light 30, and transmit the display light 30 toward the holographic panel 34. The SLM 40 may modulate the intensity of the display light 30. In another example, the SLM 40 modulates the phase of the display light 30. In another example, the SLM 40 modulates both the intensity and the phase simultaneously.

In another aspect, the head-up display system 20 further comprises a pupil replicator 42 arranged to receive the display light 30 emitted from the illumination device 28, replicate the display light 30 into a plurality of display light 30, and transmit the plurality of display light 30 parallel to one another toward the holographic panel 34. The pupil replicator 42 may define an input aperture 44 and an output aperture 46 and may comprise a waveguide 48 positioned between the input and output apertures 44, 46. The display light 30 may enter the pupil replicator 42 from the SLM 40 through the input aperture 44 and totally internally reflect within the waveguide 48. As shown in FIG. 1, the output aperture 46 may occupy a surface area that is greater than a surface area of the input aperture 44. The display light 30 totally internally reflects within the waveguide 48, with the reflection scattering the display light 30 across the output aperture 46. The display light 30 then exits the pupil replicator 42 as the plurality of display light 30 across the surface area of the output aperture 46. As such, the pupil replicator 42 expands the area in which the display light 30 from the illumination device 28 may be viewed. More specifically, the surface area of the output aperture 46 is sized and shaped to transmit the plurality of display light 30 to an equivalently sized and shaped eyebox 50. The eyebox 50 is the position of the plurality of display light 30 within the vehicle 22 at which the eyes 24 of the occupant 26 should be positioned. More specifically, the eyebox 50 provides the plurality of display light 30 over a surface area that is equivalent to the output aperture 46 of the pupil replicator 42. The surface area allows for deviations in the positioning of the eyes 24 of the occupant 26 (such as variations in the size of different occupants 26, variations in the positioning of the occupant 26, and general movement of the occupant 26, just to name a few) while maintaining the transmission of the display light 30. The projection of the plurality of display light 30 across the eyebox 50 ensures that the information within the display light 30 is continuously transmitted to the occupant 26 (i.e., preventing the information from alternating between being visible and not visible due to variations in the positioning of the occupant 26).

In the example shown in FIG. 1, the illumination device 28 is further defined as a laser 52, with the display light 30 emitted by the laser 52 each being coherent. However, the illumination device 28 may be any component suitable of emitting the display light 30, such as a light emitting diode. In another example, the illumination device 28 is further defined as a picture generation unit. The picture generation unit emits the display light 30 (with the information embedded therein) toward a mirror. The mirror reflects the display light 30 toward the holographic panel 34. The display light 30 transmits to the holographic panel 34. The display light 30 may then diffract off of the windshield 32 and toward the eyes 24 of the occupant 26. In one example, the picture generation unit is further defined as a liquid crystal display. In another example, the picture generation unit is further defined as a digital light processing projector.

In the example shown in FIGS. 1 and 7, the holographic panel 34 is positioned above the pupil replicator 42, with the plurality of display light 30 transmitted from the pupil replicator 42 toward the holographic panel 34. In this example, the holographic panel 34 is sized relative to the entire output aperture 46 of the pupil replicator 42 such that all of the plurality of display light 30 interacts with the holographic panel 34.

Figure 3:
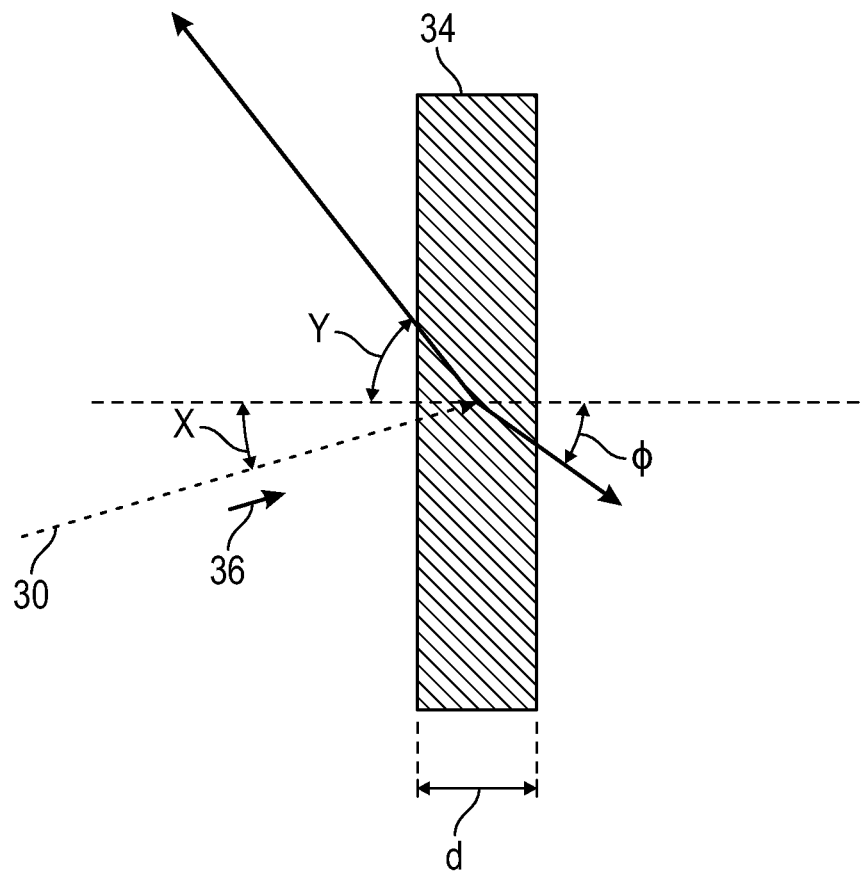
FIG. 3 is a cross-sectional view of one example of the holographic panel.

With reference to FIG. 3, optical elements of the holographic panel 34 are designed to ensure diffraction of the display light 30 at the desired in the exit direction 38 at the exit angle Y based upon the known entrance angle X. The optical elements may include a grating angle φ, a periodicity Λ, a refractive index modulation Δn, and a thickness d. In one example, the thickness of the holographic panel 34 is of about 10 μm to about 100 μm. In another example, the thickness of the holographic panel 34 is of about 50 μm to about 70 μm. In one example, the grating angle φ of the holographic panel 34 is of about 90 degrees to about 180 degrees. In one example, the refractive index modulation of the holographic panel 34 is of about 0.001 to about 0.05. In another example, the refractive index modulation of the holographic panel 34 is of about 0.003 to about 0.02. In one example, the periodicity Λ of the layer 42 is from the operation wavelength λ to 10 μm. In another example, the periodicity Λ of the layer 42 is from the operation central wavelength λ to 2 μm. In one example, the ratio between the periodicity Λ and the central wavelength λ is from about 1.5:1 to about 1:1. In one example, the refractive index of the material is from about 1.49 to about 1.51. In one example, the holographic panel 34 comprises a polymer. However, the holographic panel 34 may comprise glass or any other material suitable.

Figure 5:
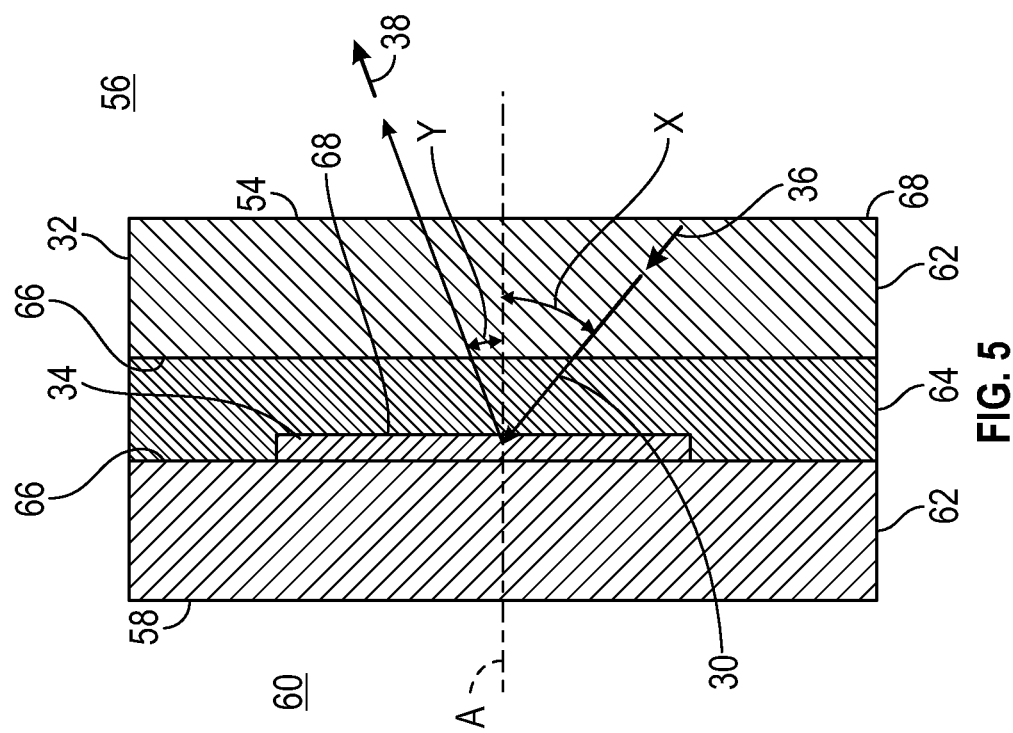
FIG. 5 is a cross-sectional view of one example of the head-up display system showing the holographic panel disposed along an internal surface of one sheet of the windshield.
Figure 4:
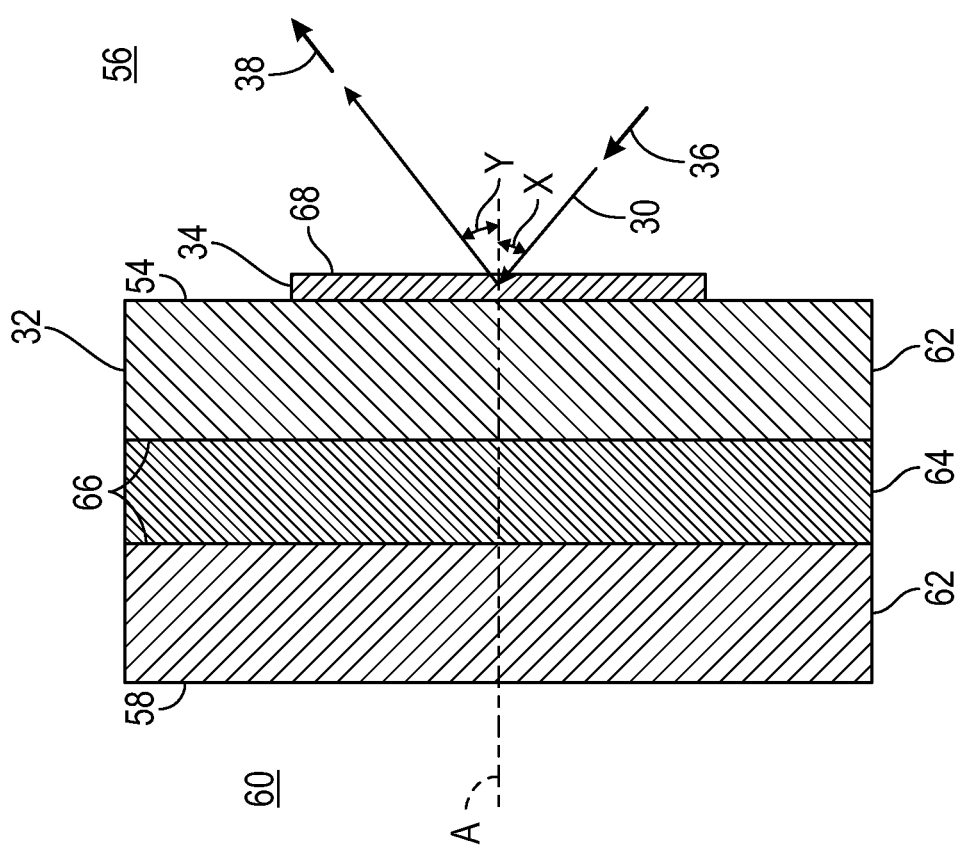
FIG. 4 is a cross-sectional view of one example of the head-up display system showing the holographic panel disposed along an inner surface of the windshield.

The windshield 32 may comprise an inner surface 54 facing an interior 56 of the vehicle 22 and an outer surface 58 facing an exterior 60 of the vehicle 22. In the example shown in FIG. 4, the holographic panel 34 is disposed along the inner surface 54 of the windshield 32. The windshield 32 may comprise at least two sheets 62 stacked between the inner and outer surfaces 54, 58. The at least two sheets 62 may be comprised of glass with a polymer interlayer 64 disposed therebetween to bond the sheets 62 together and to hold the sheets 62 in place in the event of shattering. Each of the sheets 62 comprise at least one internal surface 66 facing the internal surface 66 of another adjacent sheet 62. The holographic panel 34 may be disposed along the internal surface 66 of one of the sheets 62. FIG. 5 shows one example of holographic panel 34 disposed on the internal surface 66 of the sheet 62 having the outer surface 58. In one example, the holographic panel 34 is a film 68 adhered to the windshield 32. However, the holographic panel 34 may be applied to the windshield 32 as a coating.

Figure 2:
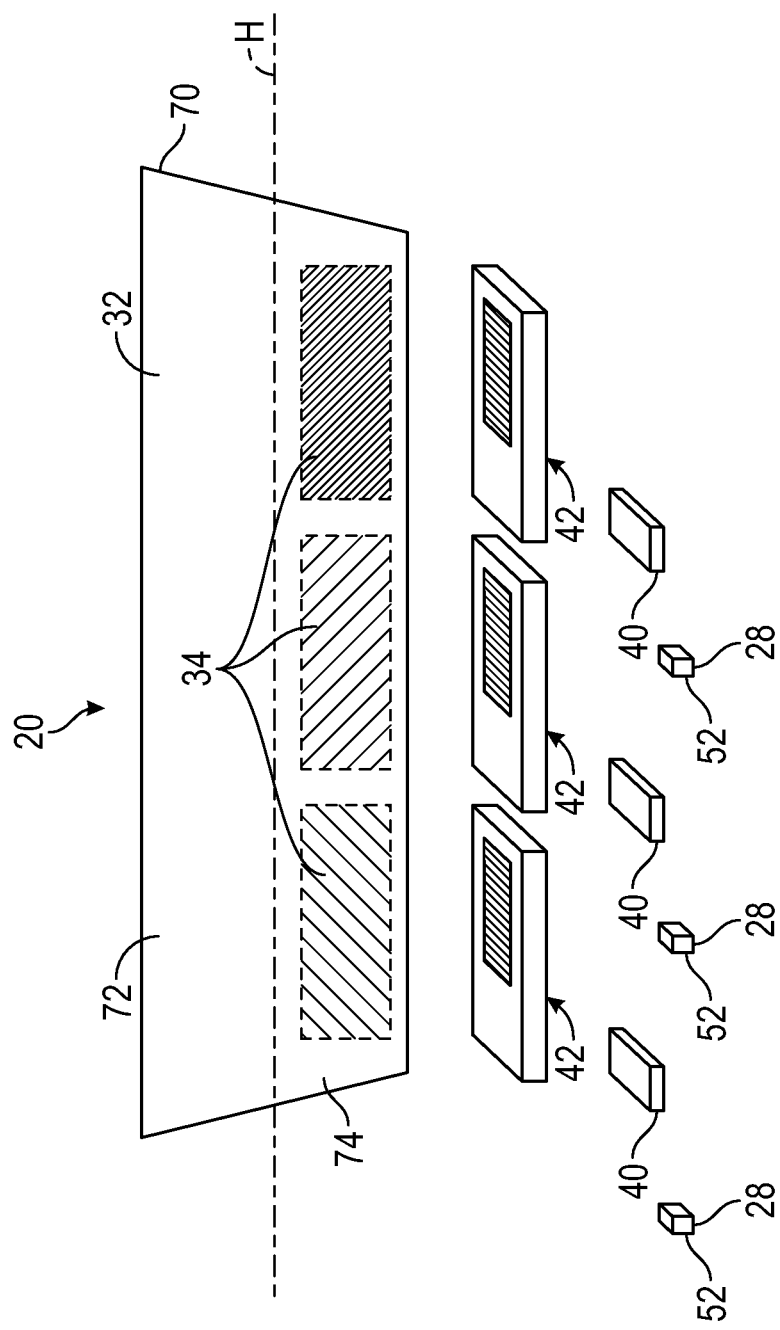
FIG. 2 is a perspective view of one example of the head-up display system showing three of the illumination device and three of the holographic panels, with the holographic panels disposed along a lower section of the windshield.

The windshield 32 defines a surface area 70. The holographic panel 34 may be disposed along a portion of the windshield 32 that is less than the surface area 70, as shown in FIG. 2. However, the holographic panel 34 may be disposed along the entire surface area 70 of the windshield 32. Furthermore, the windshield 32 defines a horizontal axis H bisecting the windshield 32 and defines an upper section 72 above the horizontal axis H and a lower section 74 below the horizontal axis H. The holographic panel 34 may be disposed within the lower section 74 of the windshield 32 as shown in FIG. 2. However, the holographic panel 34 may be disposed in the upper section 72 or in both of the upper and lower sections 72, 74.

Figure 6:
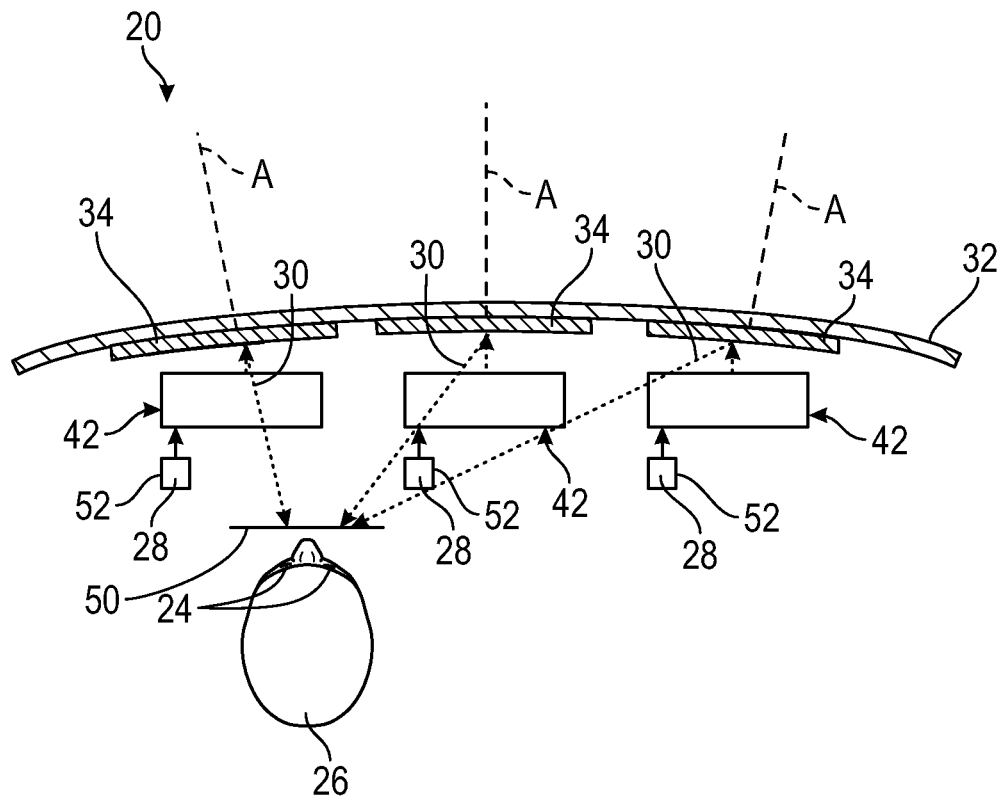
FIG. 6 is a top plan view of one example of the head-up display system showing the display lights emitted by the three illumination devices and diffracted by the respective three holographic panels toward the eyes of the occupants.

With reference to FIGS. 1, 2, and 6, the illumination device 28 may be further defined as at least two illumination devices 28 and the holographic panel 34 may be further defined as at least two holographic panels 34, with each of the holographic panels 34 individually corresponding to the at least two illumination devices 28. Each of the at least two holographic panels 34 may be spaced from one another horizontally along the windshield 32. Each of the illumination devices 28 emit the respective display light 30 toward the respective holographic panel 34 and each of holographic panels 34 diffract the display lights 30 toward the common eyebox 50 defined as the general location of the eyes 24 of the occupant 26.

Each of the illumination devices 28 emit the display light 30 toward the respective holographic panel 34 and each of holographic panels 34 diffract the respective display light 30 toward the eyes 24 of the occupant 26. In the example shown in FIGS. 2 and 6, the at least two illumination devices 28 is shown as three illumination devices 28 and the at least two holographic panels 34 is shown as three holographic panels 34. However, any number of illumination devices 28 and holographic panels 34 may be utilized. The at least two illumination devices 28 and the at least two holographic panels 34 provide multiple displays with multiple information to the occupant 26. Accordingly, more information can be provided to the occupant 26 without diverting the eyes 24 of the occupant 26 away from the road.

Accordingly, the head-up display system 20 offers several advantages. The holographic panel 34 diffracts the display light 30 toward the eyes 24 of the occupant 26, regardless of the entrance angle. As such, the illumination device 28 may be positioned within the vehicle 22 without specific consideration of maintaining equal entrance and exit angles, which improves the packageability of the illumination device 28.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A head-up display system of a vehicle for visually transmitting information to eyes of an occupant, comprising:
   a common eyebox defined as a general location of the eyes of the occupant;
   at least two illumination devices configured to emit a display light;
   a windshield spaced from the at least two illumination devices and extending transverse to the display light; and
   at least two holographic panels coupled to and extending with the windshield, wherein each of the at least two holographic panels are spaced apart from one another and extend horizontally along the windshield and individually receiving the display light from a corresponding one of the at least two illumination devices, wherein each of the at least two holographic panels include an exit angle arranged to diffract the display light toward the eyes of the occupant, and wherein the exit angle for each of the at least two holographic panels is different from one another;
   wherein for each of the at least two illumination devices, the display light emits toward a corresponding one of the holographic panels in an entrance direction at an entrance angle relative to an axis normal to the corresponding one of the holographic panels and diffracts away from the corresponding one of the holographic panels in an exit direction at the exit angle relative to the axis, which is different than the entrance angle.

2. The head-up display system of claim 1, wherein the windshield defines a surface area, with the at least two holographic panels disposed along a portion of the windshield that is less than the surface area.

3. The head-up display system of claim 2, wherein the windshield defines a horizontal axis bisecting the windshield and defines an upper section above the horizontal axis and a lower section below the horizontal axis, with the at least two holographic panels disposed within the lower section of the windshield.

4. The head-up display system of claim 1, wherein the windshield comprises an inner surface facing an interior of the vehicle and an outer surface facing an exterior of the vehicle, with the at least two holographic panels disposed along the inner surface of the windshield.

5. The head-up display system of claim 1, wherein the windshield comprises at least two sheets stacked between the inner and outer surfaces, with each of the sheets comprising at least one internal surface facing the internal surface of another adjacent sheet, and with the at least two holographic panels disposed along the internal surface of one of the sheets.

6. The head-up display system of claim 5, wherein the at least two sheets are comprised of glass.

7. The head-up display system of claim 1, wherein each of the at least two holographic panels have a thickness of about 10 μm to about 100 μm.

8. The head-up display system of claim 7, wherein the thickness of the at least two holographic panels is about 50 μm to about 70 μm.

9. The head-up display system of claim 1, wherein each of the at least two holographic panels have a grating angle of about 90 degrees to about 180 degrees.

10. The head-up display system of claim 1, wherein each of the at least two holographic panels have a refractive index modulation of about 0.001 to about 0.05.

11. The head-up display system of claim 10, wherein the refractive index modulation of the at least two holographic panels is of about 0.003 to about 0.02.

12. The head-up display system of claim 1, wherein the at least two holographic panels are a film adhered to the windshield.

13. The head-up display system of claim 1, further comprising at least two spatial light modulators, each proximate to one of the at least two illumination devices and arranged to receive the display light emitted from a respective one of the at least two illumination devices, impose a holographic image on the display light, and transmit the display light toward a respective one of the at least two holographic panels.

14. The head-up display system of claim 1, further comprising a pupil replicator arranged to receive the display light emitted from the at least two illumination devices, replicate the display light into a plurality of display light, and transmit the plurality of display light parallel to one another toward the at least two holographic panels.

15. The head-up display system of claim 1, wherein the at least two illumination devices are each further defined as a laser, with the display light emitted by the laser being coherent.

16. A head-up display system of a vehicle for visually transmitting information to eyes of an occupant, comprising:
   a common eyebox defined as a general location of the eyes of the occupant;
   at least two illumination devices each configured to emit a display light;
   a windshield spaced from the at least two illumination devices and extending transverse to the display light; and
   at least two holographic panels coupled to and extending with the windshield, wherein each of the at least two holographic panels are spaced apart from one another and extend horizontally along the windshield with each of the at least two holographic panels individually receiving the display light from a corresponding one of the at least two illumination devices, wherein each of the at least two holographic panels include an exit angle arranged to diffract the respective display light toward the common eyebox, and wherein the exit angle for each of the at least two holographic panels is different from one another;

at least two pupil replicators each disposed between a respective one of the at least two illumination devices and a respective one of the at least two holographic panels, each of the at least two pupil replicators including an input aperture and an output aperture with a waveguide positioned between the input aperture and output aperture, wherein the input apertures of the at least two pupil replicators receive display light from the respective at least one illumination device;

wherein each of the display lights emit toward the respective holographic panel in an entrance direction at an entrance angle relative to an axis normal to the respective holographic panel and diffract away from the respective holographic panel in an exit direction at the exit angle relative to the axis, which is different than the entrance angle; and wherein the windshield defines a surface area, with each of the holographic panels disposed along a portion of the windshield that is less than the surface area.

17. A head-up display system of a vehicle for visually transmitting information to eyes of an occupant, comprising:
   a common eyebox defined as a general location of the eyes of the occupant;
   at least two illumination devices each configured to emit a display light;
   a windshield spaced from the at least two illumination devices and extending transverse to the display light; and
   at least two holographic panels coupled to and extending with the windshield, wherein each of the at least two holographic panels are spaced apart from one another and extend horizontally along the windshield with each of the at least two holographic panels individually receiving the display light from a corresponding one of the at least two illumination devices, wherein each of the at least two holographic panels include an exit angle arranged to diffract the respective display light toward the common eyebox, and wherein the exit angle for each of the at least two holographic panels is different from one another;

wherein each of the display lights emit toward the respective holographic panel in an entrance direction at an entrance angle relative to an axis normal to the respective holographic panel and diffract away from the respective holographic panel in an exit direction at the exit angle relative to the axis, which is different than the entrance angle;

wherein the windshield defines a surface area, with each of the at least two holographic panels disposed along a portion of the windshield that is less than the surface area;

wherein the windshield defines a horizontal axis bisecting the windshield and defines an upper section above the horizontal axis and a lower section below the horizontal axis, with the at least two holographic panels disposed within the lower section of the windshield;

wherein each of the at least two holographic panels have a thickness of about 10 µm to about 100 µm;

wherein each of the at least two holographic panels have a grating angle of about 90 degrees to about 180 degrees; and wherein each of the at least two holographic panels have a refractive index modulation of about 0.001 to about 0.05.

\* \* \* \* \*